(12) United States Patent
Zhou et al.

(10) Patent No.: US 9,003,343 B2
(45) Date of Patent: Apr. 7, 2015

(54) ENERGY CONSUMPTION SIMULATION AND EVALUATION SYSTEM FOR EMBEDDED DEVICE

(71) Applicant: Harbin Institute of Technology, Harbin, Heilongjiang (CN)

(72) Inventors: Haiying Zhou, Harbin (CN); Kun-Mean Hou, Harbin (CN); Decheng Zuo, Harbin (CN); Jianjin Li, Harbin (CN); Jian Li, Harbin (CN); Peng Zhou, Harbin (CN); Heping Xie, Harbin (CN); Yuanyuan Wang, Harbin (CN); Lianya Hu, Harbin (CN)

(73) Assignee: Harbin Institute of Technology, Harbin, Heilongjiang Province (CN)

( * ) Notice: Subject to any disclaimer, the term of this patent is extended or adjusted under 35 U.S.C. 154(b) by 37 days.

(21) Appl. No.: 13/856,329

(22) Filed: Apr. 3, 2013

(65) Prior Publication Data

US 2014/0208287 A1  Jul. 24, 2014

(30) Foreign Application Priority Data

Jan. 18, 2013  (CN) .......................... 2013 1 0020199

(51) Int. Cl.
G06F 9/455 (2006.01)
G06F 17/50 (2006.01)

(52) U.S. Cl.
CPC ................... G06F 17/5009 (2013.01)

(58) Field of Classification Search
USPC ....................................................... 716/109
See application file for complete search history.

(56) References Cited

U.S. PATENT DOCUMENTS

2007/0288885 A1* 12/2007 Brunel et al. .................. 717/104

OTHER PUBLICATIONS

Shorin, Dmitriy; Zimmermann, Armin; Maciel, Paulo, "Transforming UML State Machines into Stochastic Petri Nets for Energy Consumption Estimation of Embedded Systems," Oct. 4, 2012, IEEE.*

* cited by examiner

*Primary Examiner* — Eric Lee
(74) *Attorney, Agent, or Firm* — Novoclaims Patent Services LLC; Mei Lin Wong (57) ABSTRACT

An energy consumption simulation and evaluation system for embedded device in energy consumption evaluation technology for electronic devices, which solves the problem that the energy consumption cannot be simulated under tasks operation condition with the existing systems. The present invention includes a graphical configuration management module for inputting graphical configuration parameters, a device energy consumption model building block for obtaining the AADL description model for software and hardware components through AADL abstract description of software and hardware at system-level, a model transformation module for AADL to GSPN model transformation; and a GSPN simulation module which utilizes QPME tool to simulate GSPN model; selectively loads an external energy-consuming event from the energy-consuming events sequence; and perform energy consumption simulation for the GSPN model in response to the external energy-consuming event by QPME tool to obtain a simulation result of the residual energy and lifetime of the system.

10 Claims, 7 Drawing Sheets

ENERGY CONSUMPTION SIMULATION AND EVALUATION SYSTEM FOR EMBEDDED DEVICE

CROSS REFERENCE OF RELATED APPLICATION

This is a non-provisional application which claims foreign application number 201310020199.X with a filing date of Jan. 18, 2013 in China. The contents of this specification, including any intervening amendments thereto, are incorporated herein by reference.

BACKGROUND OF THE PRESENT INVENTION

1. Field of Invention

The present invention relates to energy consumption evaluation for electronic device, and more particularly to embedded system in energy consumption evaluation.

2. Description of Related Art

An embedded system mainly includes embedded processor, related supporting hardware system and embedded software system. And the embedded system is an integrated "device" of hardware and software which can run independently. The embedded processor is mainly composed of a single-chip microcomputer or a microcontroller unit (MCU) and the supporting hardware may include graphics card, storage medium (such as ROM, RAM and etc.), communication equipment, IC card or credit card reading device, and etc.

The embedded system is different from a general computing system in which the embedded system does not have a large storage medium like hard disk, and utilizes Flash Memory as the storage medium. The embedded software includes underlying software which is related to hardware, e.g. operating system, graphical interface, communication protocol, database system, standardized browser, application software and etc.

Embedded system is the most widely used computing system. With the development of computer hardware technology, the performance of the embedded device becomes higher and higher. In order to keep mobility, the majorities of embedded device unable to connect to a fixed power source and usually use batteries for power supply. However, battery has limited power supply and fails to meet the ever growing computing requirements. For example, five years ago, a cell phone can be used for one week per charging while a smart phone now can be used for at most two days and has to be recharged. At the same time, the energy cost of the embedded system with active power supply has dramatically increased with the increase in energy prices. The energy supply issue becomes a key limiting factor in the development of embedded device. Since the limitations imposed by energy storage capacity of battery, the effective utilization of battery power and the extension of embedded system running time become an urgent and unavoidable issues.

Most of existing energy consumption simulation systems for embedded device simulate at the hardware level. This kind of simulation systems simulates at circuit level and the majority of which are designed by hardware developers. In other words, this type of simulation system is targeted at the hardware product of the developers only. This kind of simulation system is related to hardware platform directly so the energy consumption parameters of the device are required for simulation. In other words, the hardware has to be physical implemented. Therefore this type of existing simulation system is not suitable to simulate the non-existed devices or devices under development. In addition, this type of simulation system is not platform-independent, and it is impossible to compare results between different platforms. Besides, existing simulation systems only support hardware energy consumption simulation and fail to consider the effect of software in energy consumption. For a normal embedded device, it consumes the most energy when the device is running tasks. The energy consumption is different a lot between an idle system and a system with load charging. Furthermore, some kinds of processor, such as ARM, support multiple sets of instructions (ARM supports both 32-bit and 16-bit instructions sets), and the energy consumption level is different while running in different instruction modes (the 16 mode has a much lower energy consumption level than the 32 mode in ARM) while the switching of instruction modes is mostly caused by the task requirement. For example, the energy consumption of system has a big difference between wireless communication and computing. Accordingly, the existing simulation system can only simulate the energy consumption of hardware and fails to obtain the actual energy consumption of a running embedded system.

SUMMARY OF THE PRESENT INVENTION

In order to solve the problem of the existing simulation system that fails to simulate energy consumption of the embedded system under different task running states, the present invention provides an energy consumption simulation and evaluation system for embedded system which can simulate energy consumption under different task running states.

Additional advantages and features of the invention will become apparent from the description which follows, and may be implemented by means of the instrumentalities and combinations particular point out in the appended claims.

According to the preferred embodiment of the present invention, the foregoing and other objects and advantages are attained by the energy consumption simulation and evaluation system for embedded device includes a graphical configuration management module, an event generator, a device energy consumption model building block, an AADL to GSPN model transformation module and a GSPN simulation module for device energy consumption model, wherein:

the graphical configuration management module is a graphical parameter configuration and input arrangement module for both the event generator and the device energy consumption model building block;

the device energy consumption model building block is arranged for obtaining the AADL description model by abstracting the software and hardware components in the embedded system at system-level with the AADL based on the parameter configuration of the graphical configuration management module;

the event generator is arranged for simulating the generation of energy-consuming events sequence;

the AADL to GSPN model transformation module is arranged for transforming the AADL model of the software and hardware components in the embedded system to GSPN model;

the GSPN simulation module for device energy consumption model is arranged for utilizing QPME tool to load GSPN model; selectively loading the external energy-consuming events from the sequence of energy-consuming events; performing energy consumption simulation for the GSPN model in response to the external energy-consuming event being loaded by utilizing QPME tool, thereby obtaining a simulation result of the residual energy and lifetime of the embedded system.

The input parameters of the device energy consumption model building block includes software and hardware architecture, component finite state machine, system scheduling policy, resource allocation policy and energy optimization policy.

The energy consumption simulation and evaluation system for embedded device further includes graphical results analysis sub-module, wherein the sub-module is arranged for graphically displaying the residual energy and the system lifetime, energy consumption of components, executing events and the event that consumes the most energy according to the simulation results of the GSPN device energy consumption model, and for generating a simulation log according to the selection command as desired.

Another object of the present invention is to provide a general modeling, simulation and evaluation platform of energy-consuming behavior at system level for embedded systems.

According to the preferred embodiment of the present invention, the energy consumption simulation and evaluation system for embedded device makes use of AADL (Architecture Analysis and Design Language) to implement the hardware and software-co and platform-independent system model at system-level, and simulating the energy consumption with event-based method through GSPN (Generalized Stochastic Petri Net) for implementing energy consumption simulation under different application environments, different workload strength, different dispatch strategies and different hardware architectures, therefore providing a reference for system designing, enhancing the design quality and accelerating system development.

According to the preferred embodiment of the present invention, the energy consumption simulation and evaluation system provides a step-by-step method to abstract the embedded device from system requirements to graphical description and then to formal description through AADL and GSPN, and provides an automated abstraction tool to avoid cognitive errors caused by uncertainty requirements and deviations of understanding during designing, analyzing and abstracting a complex system.

AADL is an architecture analysis and design language developed and guided by the SAE which is specialized in the description of software and hardware components and system architecture of embedded device. Petri net is a rigorous mathematical formulation of discrete and parallel systems which proposed by Carl A. Petri in 1960, it is specialized in modeling for asynchronous and concurrent computer systems. Although the AADL language standard and Petri net simulation tools are relatively perfect, AADL fails to provide simulation modeling with rigorous mathematical formulation while Petri net are too abstract to be understood and used by most people. The present invention has combined the advantages of AADL and Petri net, and also shields the shortcomings. It is a user-friendly, simple and easy to use system with formal verification capability.

According to the preferred embodiment of the present invention, the simulation system employs AADL and GSPN to provide a modeling method for energy consumption in embedded device based on event-driven method and state transition method, which is effective in analyzing the integral energy consumed by the software and hardware components of embedded device. First, the energy-consuming events, the energy-consuming behaviors and the energy-consuming statuses of the embedded device are analyzed, then the system software and hardware architectures are graphically presented and the energy-consuming behaviors are modeled with the AADL method; then automatically transform the AADL model of system into abstract 4-tuple model based on GSPN; then initiate the GSPN mode with the external event generator, then start energy consumption simulation; and evaluate the energy consumption and system lifetime of the embedded device. According to the evaluation results obtained by the simulation system of the present invention, guidance can be provided for selecting the suitable task mode and embedded device's components for different application environments, designing software and hardware architecture, optimizing the energy-consuming parameters, system dispatch protocols and resource allocation protocols for both software and hardware components, thereby providing an accurate and reliable reference to design a system with optimal energy consumption.

The simulation system of the present invention is a platform-independent designing and simulation and verification tool which does not require the physical implementation of embedded system and is capable of providing verification for system proposal during the design stage. The capability of verification at the design stage in relation to energy consumption of software and hardware components greatly shorten the program development time and reduce the risks caused by unreasonable solutions and the cost of the program development. Through the simulation tool of the present invention, system energy consumption property and lifetime with different application and different task requirements can be verified. Accordingly, the important reference can be provided for embedded systems in the market, especially for those embedded device without charging capability such as mobile phones. Therefore reducing the risk of purchasing a system which fails to meet the lifetime requirement and the risk of business loss.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
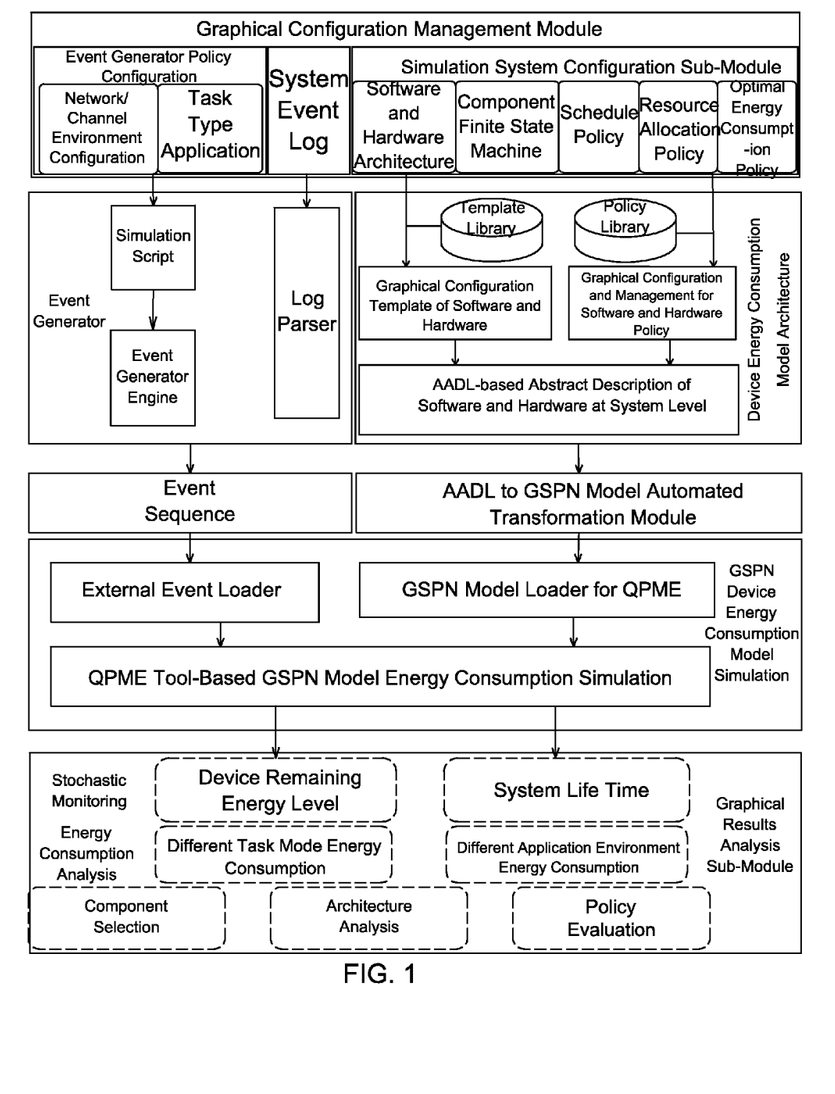
FIG. 1 is a framework illustration of an energy consumption simulation and evaluation system for embedded device according to a preferred embodiment of the present invention.

Embodiment 1: This embodiment is illustrated in FIG. 1 of the drawings. According to the energy consumption simulation and evaluation system for embedded device of this embodiment, the system includes a graphical configuration management module, an event generator, device energy consumption model building block, an AADL to GSPN model transformation module and a GSPN simulation module for device energy consumption model, wherein the graphical configuration management module is a graphical parameter configuration and input arrangement module for both the event generator and the device energy consumption model building block;

the device energy consumption model building block is arranged for obtaining the AADL description model for software and hardware components in the embedded system by utilizing the abstract description of the AADL system-level software and hardware based on the parameter configuration of the graphical configuration management module;

the event generator is arranged for simulating the generation of energy-consuming events sequence;

the AADL to GSPN model transformation module is arranged for transforming the AADL model of the software and hardware components in the embedded system to GSPN model;

the GSPN simulation module for device energy consumption model is arranged for utilizing QPME tool to load GSPN model; selectively loading an external energy-consuming event from the sequence of energy-consuming events; performing energy consumption simulation for the GSPN model in response to the external energy-consuming event being loaded by utilizing QPME tool, thereby obtaining a simulation result of the residual energy and lifetime of the embedded system.

Embedded device have a wide range of applications such as environmental information detection, medical application, and wearable computers for individual soldier at battlefield, and etc. And the workloads of different applications have different characteristics. Some of which need periodical data sampling, some need mandatory embedded operation. The environment model of embedded device is arranged for simulation of a variety of external environment in connection between the embedded device while exchanging information. According to this embodiment, the event generator is used to generate energy-consuming events for the embedded device to simulate the external environment.

The event generator model is arranged for building and generating events of the complex and fast changing embedded application. As the embedded external environment is highly complex and changes fast, a plurality of time-varying factors (such as task traffic, wireless channel and network topology) can be customized so that different embedded application events and application environment can be generated as needed.

Embodiment 2: This embodiment is illustrated in FIG. 1 of the drawings and includes further description of the energy consumption simulation and evaluation system for embedded device of the embodiment 1. In this embodiment, the input parameters of the device energy consumption model building block includes software and hardware architecture of the embedded system, component finite state machine, system dispatch strategy, resource allocation strategy and energy optimization strategy.

A user can configure the embedded system according to actual situation or compare and analyze the design for optimal energy consumption. Based on the user profile, generate system data includes embedded device architecture, module states and energy consumption data, software and hardware configuration information of embedded device and task data of embedded device. General data can be generated as a template profile.

Different system configurations, different devices (or components) and different strategies are the impact factors which may cause different power requirements in performing tasks in the system. Therefore, when building the device energy consumption model, the required parameters includes software and hardware architecture of the embedded system, component finite state machine, system dispatch strategy, resource allocation strategy and energy optimization strategy.

The hardware architecture refers to all energy consuming components which comprises the processor of embedded device and wireless communication unit. The user can customize more than one processor and different models processors to accelerate the device. The user can also customize with different kinds of peripherals to realize different application needs. These can build the embedded device with different hardware architecture and the power requirement of the device will be different with change of the hardware architecture.

The software architecture refers to the software which is embedded in the hardware. Different software architecture will also cause differences in frequency of communication, level of computation, number of memory copying, which will lead to differences in the length and frequency of energy consuming activities of the system.

The above software and hardware architecture has direct impact on the structure and characteristics of the components of the embedded system for simulation, and can be obtained from system design or the actual system being built.

Component finite state machine is arranged for describing the power mode transition. The majorities of devices in the embedded system have different optimal energy consumption level and are capable of working under different power level. Therefore, these transitions in power modes can be described by the component finite state machine.

The user can build the component (or device) finite state machine based on requirements. The state property of different states and the relationship between state-transition can be preset. The state property refers to the power and the time threshold of state-transition at a particular state. When the finite state machine is selected for a component, the time period at a particular state and the frequency of state-transition of the component (or device) will change which will make the energy consumption of the entire device different.

If the component is hardware, the parameters can be obtained from the specification of the particular hardware. The specification of the particular hardware usually contains the information of states relationship under operation mode and the energy consumption power of different states. If the component is software, the parameters can be obtained from the software task description, such as memory reading and writing, computing operations during computation. The component can also be a particular component designed by a designer.

The system dispatch strategy. The task dispatch consumes energy itself. Different dispatch methods will affect the execution sequence of different tasks in the system. The tasks of embedded system usually have real-time constraints. If the task which requires high level of real-time requirement needs to be finished in a short time, the operation mode and the power mode of the entire system have to be adjusted so as to ensure the completion of the particular task.

The dispatch strategy can be obtained from system scheduling algorithm or designed by the system designer.

The resource allocation strategy. The embedded device needs to provide software and hardware resources for running a plurality of applications, which involved in processor, wireless communication unit, memory unit, onboard peripheral and etc. The resource allocation strategy will directly affect the energy consumption of the device and it is particularly important for the heterogeneous multicore embedded device to execute task scheduling and resource allocation between different processor units.

The optimal energy consumption policy. The sleep policy of components and the energy consumption of the device are different with different optimal energy consumption policies. When a particular functional component is not required, this component can be selectively turned off to reduce the energy consumption according to a particular optimal energy consumption policy. For example, DPM (Dynamic Power Management) can be used in device power management effectively.

Figure 5:
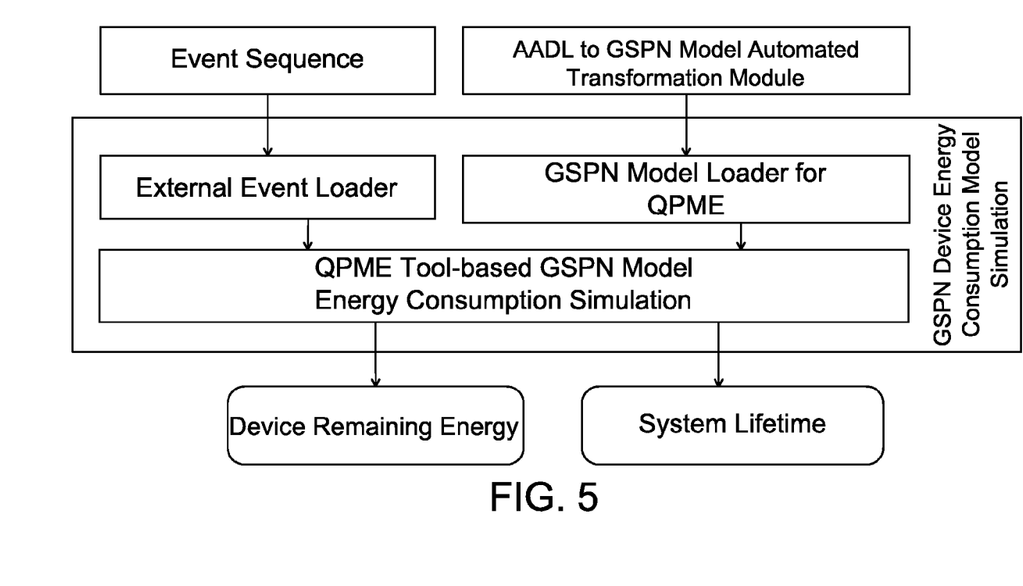
FIG. 5 is an illustration of utilization of AADL for component definition and expansion according to the preferred embodiment of the present invention.

Because of the AADL limitations in dynamic simulation, particularly in energy consumption simulation, the system of the present invention simulate with GSPN method, which is perfect and can be verified with rigorous mathematical, to perform the task of simulation. Referring to FIG. 5 of the drawings, the QPME tool is used for GSPN simulation according to the system of this preferred embodiment of the present invention.

Figure 2:
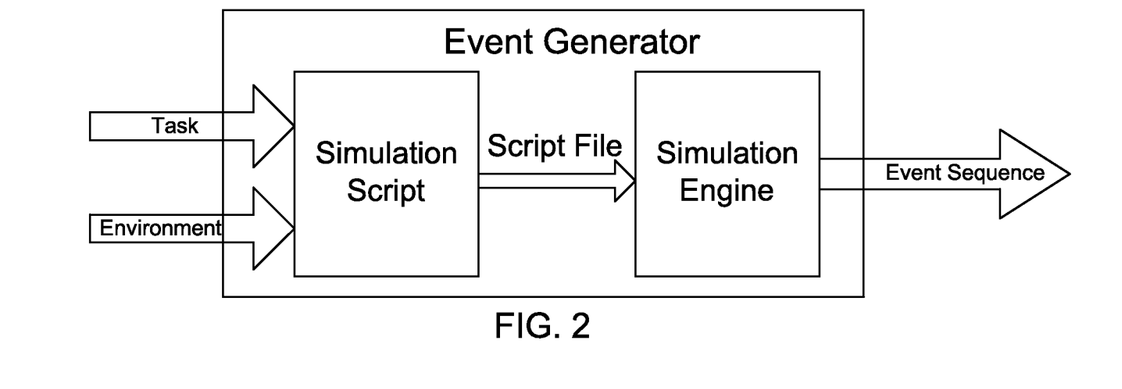
FIG. 2 is a schematic diagram of the strategy-based event generator according to the preferred embodiment 3 of the present invention.

Preferred Embodiment 3: This embodiment is illustrated in FIG. 2 of the drawings and includes further description of the energy consumption simulation and evaluation system for embedded device of the embodiment 1. In this embodiment, the event generator is arranged for simulating and generating energy-consuming event sequence which includes the steps of: utilizing an event generator engine by the simulation script which is generated according to the configuration parameters under the event generator policy of the embedded system; and obtaining the energy-consuming event sequence.

The simulation script for embedded system contains the policy configuration parameters of the event generator which includes wireless channel/network environment configuration parameters and workload type of the embedded system.

According to this embodiment, the event generator arranged for generating a time sequence is suitable for the embedded system whose generation of energy consumption sequence is based on the task requirements and configuration of application environment model.

Customize the external environment and task mode of the embedded device based on user configuration: utilize the user configuration profile to customize the corresponding business flow model, channel model, protocol and etc. and transform into executable script file with the simulation script generator for the simulation tool. Simulation software is used to simulate the interactive behavior between the embedded device and the external environment.

The simulation engine is used to simulate the interactive behavior between the embedded device and the external environment, and the user can selectively utilize software such as NS2, OPNET and etc. as the plug-in simulation engine.

The interactive behavior between the embedded device and the external environment is recorded and an orderly energy-consuming event sequence of the embedded device is generated. Through the using of simulation engine, the detailed interactive process can be recorded and saved in the simulation trace file, which is used for providing the energy-consuming event sequence by a log file processor later.

Embodiment 4: This embodiment includes further description of the energy consumption simulation and evaluation system for embedded device of the embodiment 3. In this embodiment, the graphical configuration management module is also arranged for graphical input parameters configuration of the event generator and the input parameters of the event generator are generated by the event generator policy configuration module.

The event generator policy configuration module is arranged for configuring the policies which affect a frequency of occurrence of energy-consuming events. Based on research studies, there are two reasons for the occurrence of energy-consuming events in embedded systems. The first one is caused by environment, namely environmental type; the second one is caused by task (command), namely task type.

The environmental type: At present, the majority of embedded systems have the network function. In view of wireless communications, the application environment of the embedded device will affect the quality of wireless communication channel. Based on the different environment condition, the signal attenuation factor is selected to support different environmental types such as indoor, urban and suburban conditions under different weather conditions (sunny, raining, snowing conditions). The environmental type factor will affect the energy attenuation of the packet of transmission channel and lead to the event of packet loss, which will then affect the successful rate of sending and receiving data packet and the occurrence of packet loss event. Likewise, the differences in communications media and network environment will also affect the successful rate of sending and receiving data packet and the occurrence of packet loss event in view of wired communications. For example, the transmission error rate of communication media will affect the packet accuracy rate and hence affect the number of times of packet transmission.

This module configures and selects these types of environmental parameters and obtains the packet retransmission probability through existing channel models and network congestion models. If the parameters refer to wireless communications, a signal attenuation factor which is corresponding to a common environmental conditions such as indoor, outdoor or rural area can be selected based on the system application environment. Alternately, the signal attenuation factor can be defined by the system designer. Limitation of communication can be obtained through the statistics of the laws for network congestion.

The task type: the task type refers to differences in system execution rhythm due to the actual use of the embedded system for different tasks. In different application scenarios, a wide variety of different tasks such as periodical sampling task, incidental task or a specific task under a particular task flow are involved. Common distribution functions of task flow include exponential distribution, Poisson distribution, random distribution, uniform distribution and the like. The type of tasks determines the rules of packet generation and directly determines the time and frequency of event occurrence in unit time.

This module simulates and records the timestamp and response time of the system in response to a particular event through configuring those parameters. The parameters input are specified based on actual application and the accuracy of simulation is depended on the similarity degree of the task description.

Figure 3:
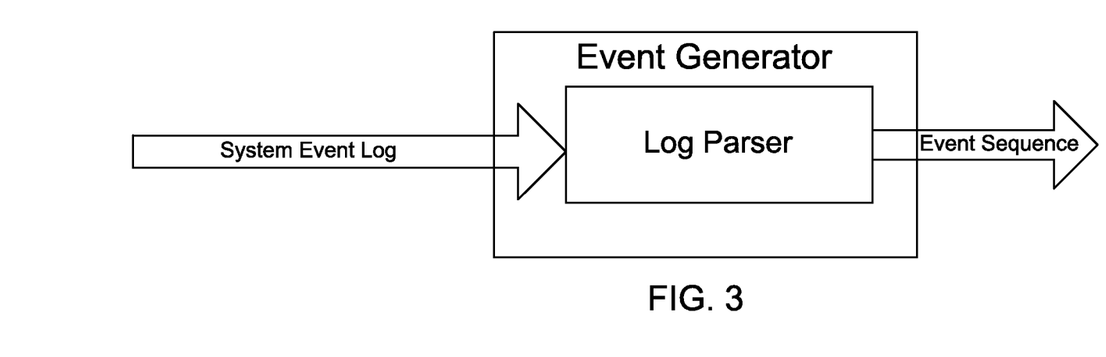
FIG. 3 is a schematic diagram of the log-based event generator according to the preferred embodiment 5 of the present invention.

Embodiment 5: This embodiment is illustrated in FIG. 3 of the drawings and includes further description of the energy consumption simulation and evaluation system for embedded device of the embodiment 1. In this embodiment, the simulation process of the event generator for generating the energy-consuming event sequence comprises the steps of: analyzing a system event log of said embedded system by using log parser; and obtaining the energy-consuming event sequence.

According to this embodiment, the system event log refers to the actual system event log of an embedded system or the software simulation log.

Embodiment 6: This embodiment includes further description of the energy consumption simulation and evaluation system for embedded device of the embodiment 5. In this embodiment, the graphical configuration management module is arranged for processing graphical configuration based on input parameters of the event generator, wherein the input parameters of the event generator is the system event log.

The system event log and the event generator policy configuration are identical in view of their functions. The parameters are used for reading and fulfilling a certain log format requirements so that the event generator can generate the energy-consuming event sequence from the log. The system event log can be the actual system recorded event log, the executed log of other simulation system of embedded device, or even a preset log customized by designer.

According to this embodiment, the system event log has the format as follows: "event occurrence time, event completion time, event component, current status of component, status of the component in the next step".

Figure 4:
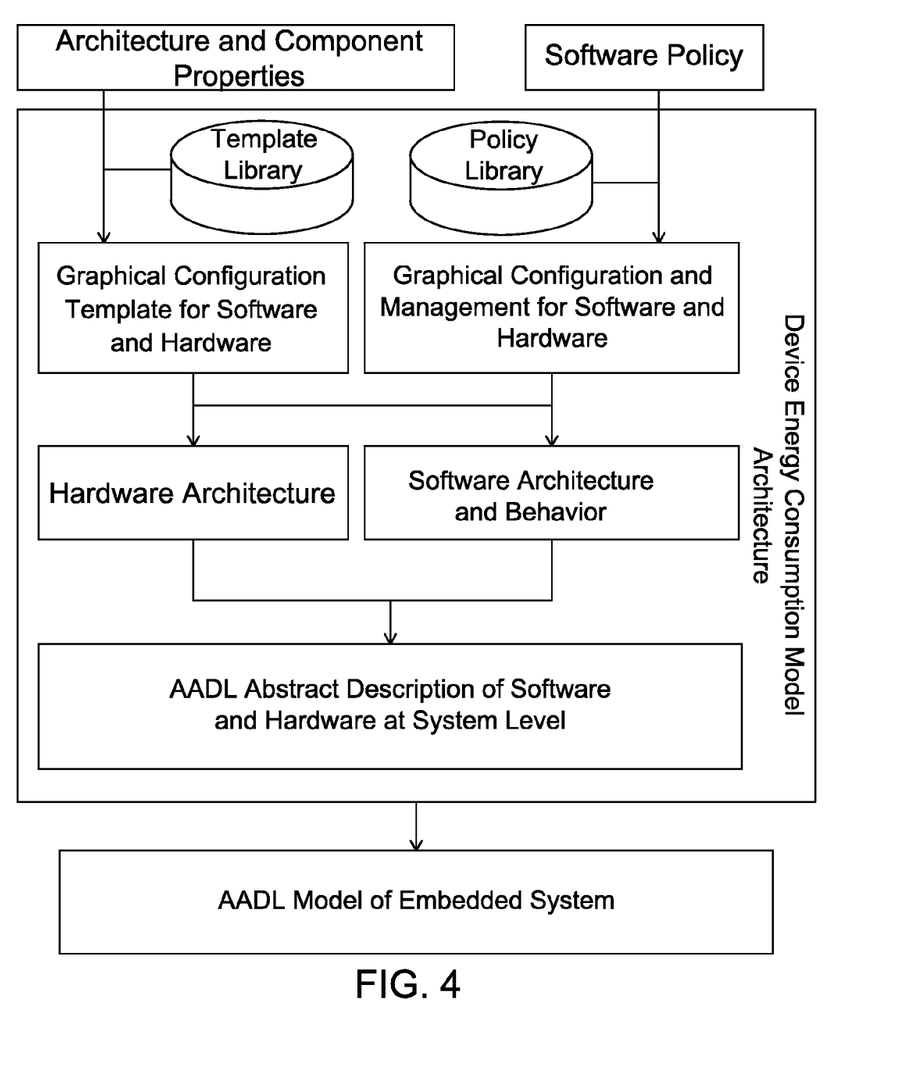
FIG. 4 is a schematic diagram of the device energy consumption model building block according to the preferred embodiment 7 of the present invention.

Embodiment 7: This embodiment is illustrated in FIG. 4 of the drawings and includes further description of the energy consumption simulation and evaluation system for embedded device of the embodiment 1. In this embodiment, a process of building an AADL model of software and hardware components of the embedded system is proposed. The AADL mode is built by abstracting at system-level of software and hardware with AADL based on the parameters configuration provide by the graphical configuration management module. The process comprises the steps of: graphical customize the hardware architecture and component property of the embedded system based on the software and hardware template library; graphical customize the software policy of the embedded system based on the software and hardware policy; generate a hardware architecture and a software architecture for the embedded system and obtain the behavior of the software and hardware based on the results from the graphical configuration and the graphical customization; use AADL language to build a graphical model for the hardware architecture and the software architecture of the embedded system, and also for the behavior of the software and hardware; and finally build the AADL model of the embedded system.

The template library is arranged for storage of common embedded device components.

The policy library is arranged for storage of common software policy of embedded device, such as state transition conditions, sleep policy and the like.

The template library and the policy library can be edited by the user for addition or modification of template or policy according to the need of user so as to fit the use of energy consumption simulation for different embedded systems.

The embedded system based on AADL language is a hardware and software co-design model, this kind of model illustrates its superiority in embedded system design and its compatibility in verification. The system employs AADL language for description of software and hardware architecture.

Referring to FIG. 5 of the drawings, the left side of FIG. 5 illustrates the abstract at software level provided by AADL, the right side of FIG. 5 illustrates the component description formed and supported by AADL. The AADL also supports component inheritance relationship and hence common component templates can be implemented through AADL.

Through expanding the AADL model library and modeling language, the present system is suitable for analytical research studies of event-based energy consumption modeling for embedded device. The embedded system is a typical event-based system, and the event driven system activity will initiate system energy consuming activity and lead to state changes of the system. Through the analysis and abstraction of the event-based mechanism of the embedded device, the system of the present invention expands the transition of AADL model to energy consumption modeling of embedded device.

Through the analysis and abstraction of the embedded system, the event-based energy consuming behavior of the embedded device is determined by both the component energy consuming behavior and the interactive relationship between components: component energy consuming behavior can be seen as a random automata unit; and the key elements of energy consumption modeling of embedded device are energy consuming behavior of energy-consuming event and the dissemination mechanism of energy-consuming event. Energy-consuming event modeling are built by followings: 1) energy-consuming status, which refers to energy-consuming status of component or connection status between components; 2) energy-consuming event, which disclose the state changes of energy-consuming status of components; 3) energy-consuming event dissemination, which defines the occurrence of state transition; 4) energy consumption state transition, where state transition is triggered by a condition (an event) for initiating the dissemination of energy-consuming event.

As the AADL Error Annex modeling for energy-consuming behavior of embedded device, and the embedded device generally save the energy based on the state transition-based sleep mechanism by selectively turning off the function components, state property (property_state) of node components and energy consumption property (property_energy) are built through extending the property of AADL in order to perform energy consumption analysis of node components accurately. Property_state defines the state transitions relationship of components of the embedded device and the condition of transition, while property_energy describes the energy-consuming status of components in different status and during state changes.

According to research studies, the energy-consuming event of embedded system can be classified into two categories according to the basis of occurrence of the event, which are 1) state transition-based energy-consuming behavior of internal components of the embedded device and 2) event-based driven interactive behavior between components of embedded device or external triggered behavior (such as user operation or response to environment state).

In view of the AADL modeling of the interactive behavior of the external component parts of the embedded device and the event-based driven method between components of the embedded device, event ports for description of the event of component parts is built through extending the AADL interface in order to analyze the interactive relationship between components accurately while event connection is extended to describe the component relation of the event-based system.

Accordingly, the model design according to this embodiment comprises the following steps:

based on the hardware architecture template library and component property of the embedded system, graphical processing software and hardware templates refers to the steps of:

Selecting a corresponding template from the template library according to the hardware architecture and component property of the embedded system; and graphical configuring the software and hardware templates according to the selected template. During the process, hardware interconnection architecture is built through the hardware architecture template while component internal status and transition relationship between components in the architecture can be instantiated automatically according to the component state machine, and the energy consumption of the corresponding state and transition should be set.

Based on the policy library and software policy of the embedded system, processing software and hardware policy for graphical customization refers to the steps of:

selecting a corresponding policy from the policy library according to the software policy of the embedded system; and graphical configuring of the software and hardware management policy according to the selected policy. The software policy includes a component finite state machine, a system scheduling policy, a resource allocation policy and an energy optimization policy. During the process, the software architecture and the resource allocation policy are built through the policy library and the software policy. For examples, the memory requirement for one process, and the processor being selected for running. The energy consumption relationship between components is described and the process is mapped to the energy consuming components.

The principle for the above energy consumption modeling is described as follows:

Energy consumption analysis for embedded device is first focused on energy consumption analysis of energy consuming components of the embedded device. Embedded device can be classified by function into the followings: sensor component (S, sensor), processor component (P, microprocessor), communication component (T, wireless transceiver) and power supply component (E, battery). Since the power supply unit of the embedded device usually is a battery, the following assumption is made for simplifying the modeling: the battery has linear discharge property; the energy consumption of the embedded device equals to the sum of energy consumption of all components.

For modeling, each component is a basic template, and therefore each embedded device is composed of templates. For example, a general embedded device (S, P, T) is generated by a sensor component template (S-template), a processor component template (P-template) and a communication component template (T-template). According to different application environment, different types and number of templates can be used. For example, five sensor component templates (S-template), three processor component templates (P-template) and two communication component templates (T-template) can be used for forming the required embedded device (5S, 3P, 2T).

The states and the events reflect the characteristic behavior of the energy consumption of the embedded device. Through research and analysis of technical documentations, the working status and state transition relationship of components can be confirmed for the embedded system based on state transition mechanism.

A processor unit template is referred to as P-template. The P-template can generally be classified into three states, which are running, idle and sleep states.

A communication unit template is referred to as T-template. The T-template can generally be classified into six states, which are shut down, idle, monitor, sleep, receive and send states.

A sensor unit template is referred to as S-template, which is relatively simple and is classified into two states which are on and off states.

According to the correlation of different components of the embedded device, the event can be classified into three types, which are: embedded device external event, component internal event and event between components. At the same time, activity (Action) is defined as response of the event-based embedded device, which represents specific action such as program execution, data transmission and the like. The embedded device consumes energy through activity (or action).

Through research and study of technical documentations and some experimental circuit tests, energy consumption data of embedded device components in different states and during state transition process can be obtained by statistical analysis, and then the energy consumption data structure of embedded device is built. The correlation between components of the event-based embedded device is described by the control structure. Through analyzing the process of components of embedded device in response to the event, the states transition process of event and the states of embedded device component are realized, the control process and data processing process of the internal component, between components and external environment are defined clearly, therefore energy consumption control structure of the embedded device can be built. The function and the behavior of the energy consumption of the embedded device are integrated according to the data structure and the control structure.

According to this embodiment, the simplified method for solving the energy consumption problem is: transforming the energy consumption problem into statistically analyzing the components under different state and time and the transition frequency at different states:

$$E_{com} = E_{dynamic} + E_{static} = E_s + E_{sc} + E_{leak}$$
$$= \sum_{i \in S} P_s * T_s(i) + \sum_{j \in SC} P_{sc} * N_{sc}(j) + P_{leak} * t$$
$$= \sum_{i \in S} P_s * T_s(i) + \sum_{j \in SC} (P_{bef} + P_{aft})/2 * N_{sc}(j) + P_{leak} * t$$

Standard description of the energy consumption template employs a formalized component energy consumption description method based on "event-action-state" and a state transition mechanism.

Energy consumption template can be configured according to the need of user in which energy-consuming status, state transition relationship, triggered event, event behavior and etc. can be customized.

Device energy consumption model: correlated hardware architecture and optimal policy for AADL modeling of the embedded device hardware.

Customized components for embedded architecture: customizing the energy consumption template, linking different energy consumption templates based on the system hardware architecture and generating device energy consumption model.

Component mapping for embedded software: modeling energy-consuming behavior and optimal policy of the embedded system in AADL and mapping the components to component energy consumption templates.

Event linkage of embedded components: Based on the interconnections between components of the event-based embedded device, modeling the event-based device energy-consuming behavior.

Figure 7:
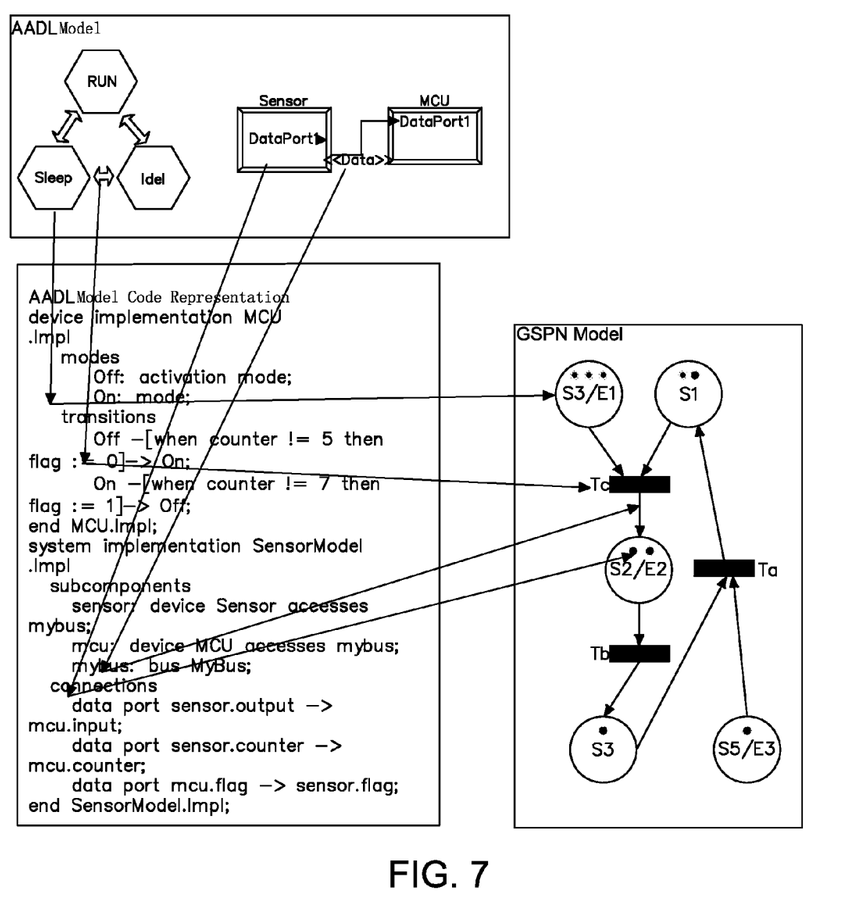
FIG. 7 is a schematic diagram of the AADL to GSPN model transformation module according to the preferred embodiment 8 of the present invention.

Embodiment 8: This embodiment is illustrated in FIG. 7 of the drawings and includes further description of the energy consumption simulation and evaluation system for embedded device of the embodiment 1. In this embodiment, a process of transforming the AADL description model of the software and hardware components of the embedded system to the GSPN model comprises the steps of:

based on GSPN modeling method and with the expanded AADL language, building an energy consumption model using GSPN; wherein the four elements in the GSPN energy consumption model are corresponding to the following elements of the AADL model:

S: state library, describing interaction activity between the embedded device and both of internal and external environments based on event; corresponding to "mode" in AADL model;

T: state transition, modeling through transition of activity, generating activity from event and causing state changes by activity; corresponding to "transition" in AADL model;

F: directed arc set, describing conditions for occurrence of state transition and effect of state transition, corresponding to "connection" in AADL model;

M: token, describing event occurrence pattern in library, capable of continuous activity during transition in Place (Place is the term of GSPN/Petri net); corresponding to energy-consuming event (data port) in AADL model.

Through AADL model, the system can be easily understood the selected software and hardware model and architecture of the embedded device directly, which can make the building the embedded energy consumption model easier. However, this type of model is not suitable for simulation. In this embodiment, the AADL model is transformed into a GPSN model. The GPSN model can be strictly formatted for processing model simulation and verification.

Figure 6:
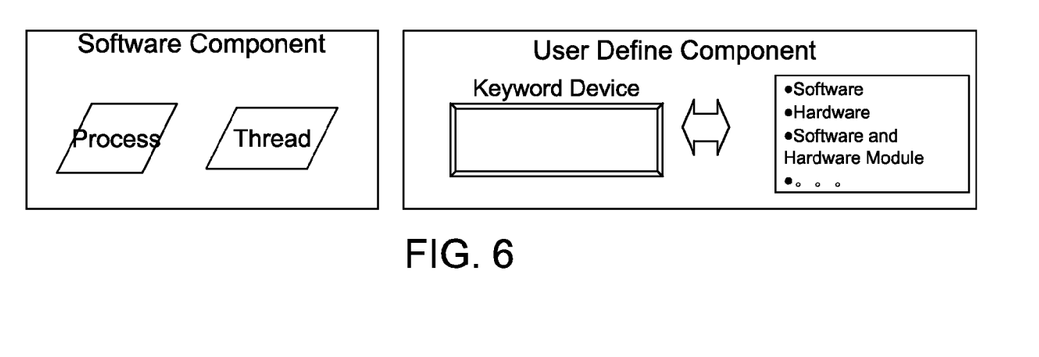
FIG. 6 is a schematic diagram of the GSPN simulation module for device energy consumption model according to the preferred embodiment 9 of the present invention.

Embodiment 9: This embodiment is illustrated in FIG. 6 of the drawings and includes further description of the energy consumption simulation and evaluation system for embedded device of the embodiment 1. In this embodiment, GPSN simulation module for device energy consumption model is further described. The GSPN simulation module for device energy consumption model is arranged for loading the GSPN model by utilizing QPME tool; selectively loading external energy-consuming events from the energy-consuming event sequence; and simulating the GSPN energy consumption model with the QPME tool based on the external energy-consuming event being loaded, thereby obtaining a simulation result of residual energy and lifetime of the embedded system.

Figure 8:
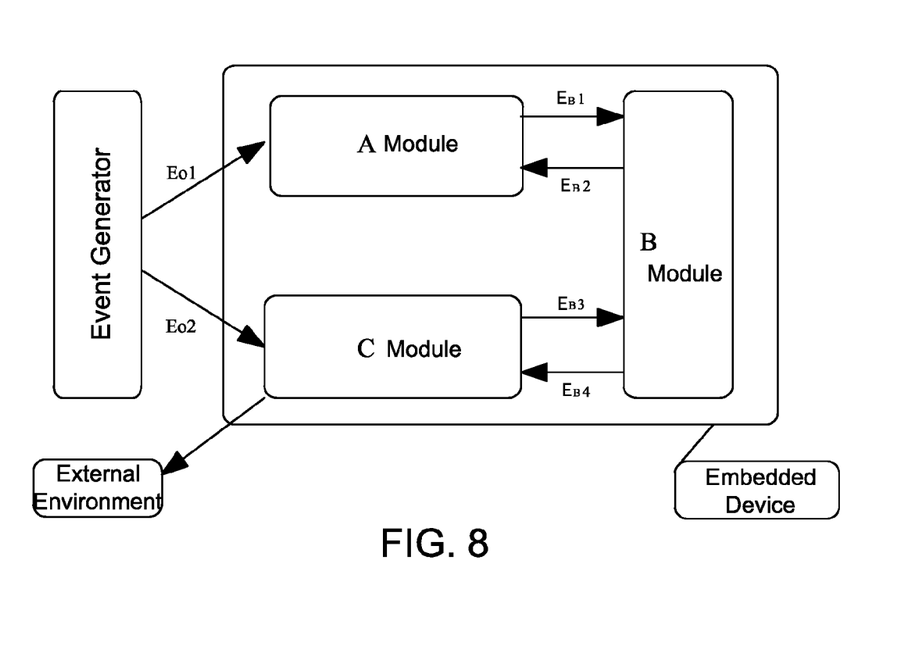
FIG. 8 is a schematic diagram of the event-based driven simulation based on GSPN according to the preferred embodiment 8 of the present invention.
Figure 9:
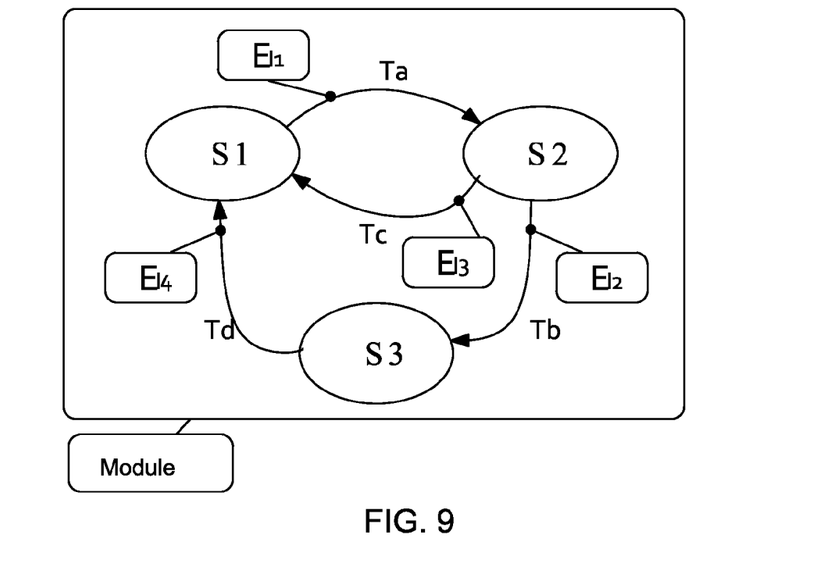
FIG. 9 is a schematic diagram of the status transition triggered by the internal event of a component according to the preferred embodiment 8 of the present invention.

There are three types of event: external event, event between components and component internal event. Referring to FIG. 8 of the drawings for one exemplary illustration, an external event (E01, E02) is provided by the event generator which is arranged for driving an operation of the embedded device; the event between components (EB1, EB2, EB3) links the different components; the component internal event (EI1, EI2, EI3, EI4) triggers component state transition, which is shown in FIG. 9 of the drawings.

The four elements of petri net N=(S, T, F, M) for modeling of event-based embedded device in AADL model which describes event, state and correlation between activity (action) are defined as follows:

S: state library, describing event-based interaction activity between the embedded device (component) and the internal and external environments; corresponding to mode in AADL model;

T: state transition, modeling through transition of activity, generating activity from event and causing state changes by activity; corresponding to transition in AADL model;

F: directed arc set, describing conditions for occurrence of state transition and effect of state transition, corresponding to connection in AADL model, where $F \subseteq (S \times T) \cup (T \times S)$;

M: token, describing event occurrence pattern in library, capable of continuous activity during transition in Place; corresponding to energy-consuming event in AADL model.

A formalized description of an event-based system mainly includes five portions, which are S, E, A, f, g, where S refers to set of states, E refers to set of events, A refers to set of actions, reaction function $a=f(s_c, e_i)$ which discloses the relationship between state, event and action, state transition function $s=g(s_c, e_i)$ which reflects the process of state-transition of the embedded device. In this model, event is built through token method, action is built through transition method, state is presented indirectly by the distribution of token in the state library, the reaction function is built by the arc converted from the event library (S->T), the state transition function is built by the arc between transition and state library (T->S), the event consume energy during the transition and execution process, therefore the energy consumption of the embedded device is presented by event-action-state (M-T-S). Extending The Petri net to be suitable for energy consumption modeling of event-based embedded device. The major model description is provided as follows:

In order to unify function and behavior, token is defined as energy consuming event which has energy consumption property (data structure), function (transition) is executed through control structure which is described through (S, T, F) description, energy is consumed along with actions which then triggers the property changes of token or generates a new token which is transmitted to the state library follow-up. Through unifying energy consumption and behavior, a formalized description for dynamic characteristics of energy consumption is achieved.

Modeling with Petri net which includes multi-process branch (embedded device components), analyzing the parallel nature of branches and asynchronous communication problems under token transition-based (event-based) condition, describing and executing unresolved issues based on action linkage; building state transition diagram for embedded device according to the state library and the token distribution through presenting all possible behaviors of the system.

Figure 10:
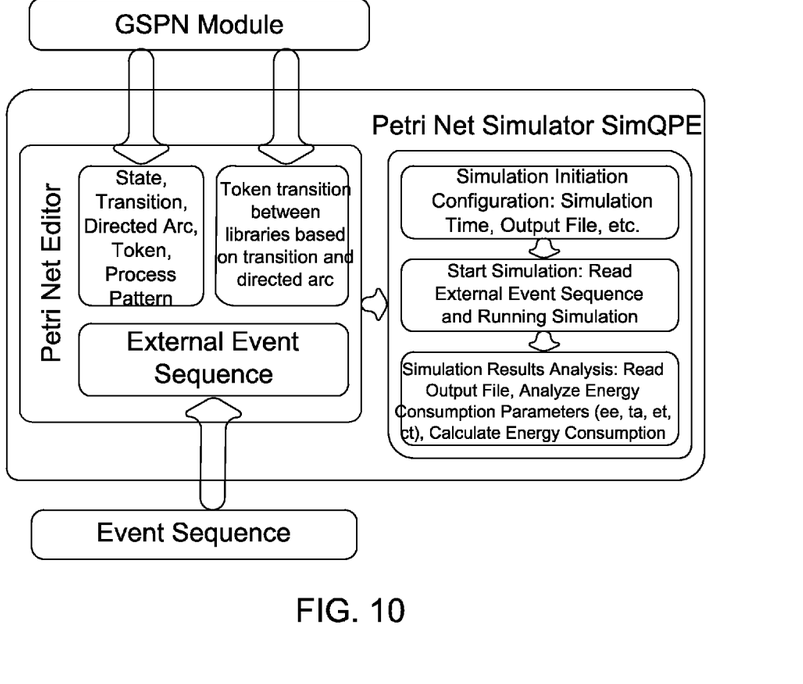
FIG. 10 is a schematic diagram of the GSPN simulation for device energy consumption model according to the preferred embodiment 9 of the present invention.

There are perfect GSPN simulation tools already. In this embodiment, a widely used GSPN tool called QPME is used for simulation process. The principle is illustrated in FIG. 10 of the drawings and the simulation process is described as follows:

The input is GSPN model;

Utilize QPME tool, load GSPN model, and generate graphical Petri net description;

Input event sequence, utilize QPME simulation device for SimQPE simulation, wherein the simulation process includes the following steps:

Initiate simulation settings such as simulation time, output file, simulation level;

Start simulation, drive the embedded device model by reading the external event sequence and initiate simulation;

Output simulation result to result file after simulation;

Read result file, analyze result to obtain the parameters for energy consumption calculation, which are the number of a particular event occurred denoted as ce, the activity time in the Place denoted as ta, the energy consumption of the action in Place in unit time donated as ea, the number of state transition induced by the event donated as ct and the energy consumption for each state transition donated as et, consolidate the simulation time and each event and calculate the total energy consumption according to the energy consumption formula.

The energy consumption of the embedded device is presented by event-action-state (M-T-S), which means each event will consume a certain amount of energy after each action corresponding to the energy consumption of the event in Place and the energy consumption of transition between Places. For each particular event, the number of occurrence of a particular event donated as ce, the activity time in Place denoted as ta, the energy consumption of the action in Place in unit time denoted as ea, the number of state transition induced by the event denoted as ct and the energy consumption for each state transition denoted as et are required, then the total energy consumption of the event denoted as Ei is as follows:

$$Ei = (ea*ta + et*ct)*ce,$$

the total energy consumption of the embedded device E is as follows:

$$E = \Sigma Ei.$$

The input of the energy consumption model of embedded device is the event sequence output from the event generator, which is the event occurrence pattern token of external event. The external event drives the energy consumption model to generate a corresponding action and consume energy. After a certain period of running time, the required parameters (ea, ta, et, ct) for the problem of energy consumption are output for calculation of the energy consumption of the embedded device under the condition of a corresponding event during this certain period of running time.

Embodiment 10: This embodiment is illustrated in FIG. 1 of the drawings and includes further description of the energy consumption simulation and evaluation system for embedded device of the embodiment 1. According to this embodiment, the system further comprises a graphical results analysis sub-module arranged for processing a graphical display of the residual energy, the system lifetime, energy consumption of components, executed events and the event consumes the most energy based on the simulation result of the GSPN device energy consumption model, and a simulation log will be generated according to the configuration as desired.

Through the graphical results analysis sub-module of this embodiment, the residual energy and the system lifetime of the embedded device can be evaluated.

A user can obtain the value of residual energy of the embedded device after running a predetermined period of time through this sub-module. If the residual energy is lower than a particular threshold value, the device will enter into a close state. At this point, the battery module of the device or the device has to be replaced to ensure the effective operation of the device. The device residual energy and the selected device component model, the hardware architecture and the software policy are correlated.

For an application system which utilizes a plurality of embedded device, if the number of runnable devices is less than a certain threshold value and the preset function cannot be completed, the system is determined by the user as entering into an invalid state and evaluates the system lifetime. In addition, the task mode as selected by the user and the application environment will also affect the system lifetime.

Through the graphical results analysis sub-module of this embodiment, the environment and task applicability of the embedded device can be evaluated.

In the system configuration module, the user can configure the environment type of the event generator to obtain the energy consumption condition under the particular environment type. The system can analyze and compare the energy consumption results repeatedly and the energy consumption and performance comparison of the embedded device under different application environment are provided.

Through the graphical results analysis sub-module of this embodiment, the selection and policy of the hardware and software of the embedded device can be optimized.

The device residual energy has a close relationship with the selection of device components. Therefore, the comparison of energy consumption simulation results between different embedded device components under the same application environment and task mode can provide important information for selection of component configuration to meet the energy consumption requirement for a particular task under a particular environment condition.

The device residual energy and the software and hardware architect of the embedded device are correlated. Different number of component parts, different architecture and different connection design will all have direct effect on the system efficiency and energy consumption. Simulation comparison of energy consumption between different software and hardware architectures using the same embedded device can be provided to facilitate simulation verification of the embedded system by the designer to find the optimal design.

Through the graphical results analysis sub-module of this embodiment, the software policy preference can be realized.

Software policy such as system scheduling, resource allocation and optimal energy consumption will affect the energy-consuming behavior of the system directly. Through employment of the present system, simulation related to energy consumption for software policy such as system scheduling, resource allocation and energy consumption optimization can be performed, thereby speeding up the process of system design and selection of the optimal software policy for the user.

According to the energy consumption simulation and evaluation system for an embedded device of the present invention, the system is an event-based embedded system and is an energy consumption simulation tool. The core idea is that energy consumption of embedded system is caused by event. The system responses the events, which includes internal or external event, to trigger a particular type or a particular set of actions or activities. These actions or activities are directly represented by behaviors which include but not limited to computing, saving data, collecting data by sensor, movement of mechanical components and system sleeping. The present system utilizes the modeling of the software and hardware architecture of the embedded device, performs simulation which provide the event occurrence pattern of the target system during operation, and then perform simulation for energy consumption of the system which is corresponding to action resulted from the event, therefore obtain the residual energy and lifetime after the system is operated for a period of time and then evaluate the system energy consumption performance of the software and hardware architecture under the particular environment and the particular task, thereby evaluate the advantages and the disadvantages of the system under different architecture and policy in relation to energy consumption.

The major features of the present invention includes the followings:

Similar to the use of UML to simplify software design, AADL simplifies the system design for embedded system. The present system fully demonstrates the advantages of AADL which realizes the platform-independent and hardware and software cooperate system model for embedded system, provides strict and formal energy consumption verification through AADL to GSPN transformation. The present system has a wide range of use which includes system design verification for embedded system, and optimal policy verification in relation to selection reference for embedded system, system scheduling, resource allocation and optimal energy consumption. The major features are further provided as follows:

Introduction and extension of AADL modeling for embedded device which utilize the integration of software and hardware for architecture modeling of the embedded device to provide a general embedded device model. In view of the diversity of the embedded device, support the performance analysis and evaluation for embedded device which is constructed by different software and hardware components (which may include embedded device components selection, system architecture, schedule modeling, interconnection policy and task mode).

Utilization of AADL model to analyze the energy-consuming behavior of embedded device which analyze the event-based state transition and dissemination of the energy-consuming behavior, integrate AADL system component of the embedded device, build the entire energy consumption model with AADL model for the embedded device to find the optimal software and hardware policy and analyze the energy-consuming behavior. In view of the application diversity of the embedded system and the embedded device, the present invention supports model analysis for state transition-based energy-consuming behavior (energy consuming event driven) and event-based interactive behavior with environment (energy-consuming event dissemination).

Construction of event generator model which support the speedy construction and generation of complex and fast-changing applications of embedded system. In view of the complexity and fast-changing external environment, a plurality of time varying element (such as task, channel and network) of the external environment can be configured so that different embedded application system and application environment can be generated according to the actual need requirements.

Construction of energy consumption evaluation platform for embedded device which is suitable for use in analyzing the device energy consumption under different device architecture and external environment. Through component selection for the embedded device, hardware architecture and description of energy consumption parameters, software configuration information, energy consumption performance simulation evaluation, description of optimal energy consumption policy and suitable scenario, and evolutionary analysis for the embedded system, theoretical models and evaluation are provided.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An energy consumption simulation and evaluation system for an embedded device, characterized in that: said system comprises a graphical configuration management module, an event generator, a device energy consumption model building block, an AADL (Architecture Analysis and Design Language) to GSPN (Generalized Stochastic Petri Net) model transformation module and a GSPN simulation module for a device energy consumption model, wherein said graphical configuration management module is a graphical parameter configuration and input arrangement for said event generator and said device energy consumption model building block;

said device energy consumption model building block is arranged for obtaining an AADL description model of software and hardware components of said energy consumption simulation and evaluation system for the embedded device by utilizing an AADL description of software and hardware at system level based on the parameter configuration of said graphical configuration management module;

said event generator is arranged for generating an energy-consuming event sequence through a simulation process for energy-consuming events;

said AADL to GSPN model transformation module is arranged for obtaining a GSPN model through transforming the AADL description model of said software and hardware components of said energy consumption simulation and evaluation system for the embedded device; and said GSPN simulation module for device energy consumption model is arranged for loading the GSPN model by utilizing a QPME (Queuing Petrinet Modeling Environment) tool; selectively loading external energy-consuming events from the energy-consuming event sequence; and simulating the GSPN model with the QPME tool based on the external energy-consuming event being loaded, thereby obtaining a simulation result of residual energy and lifetime of said energy consumption simulation and evaluation system for the embedded device.

2. The energy consumption simulation and evaluation system for an embedded device according to claim 1, wherein parameters for the parameter configuration of said graphical configuration management module for said device energy consumption model building block comprise software and hardware components architecture, a component finite state machine, a system scheduling policy, a resource allocation policy and an energy optimization policy.

3. The energy consumption simulation and evaluation system for an embedded device according to claim 1, wherein the simulation process of the event generator for generating the energy-consuming event sequence comprises the steps of:

utilizing an event generator engine through generating a simulation script based on the parameter configuration under an event generator policy of said energy consumption simulation and evaluation system for the embedded device; and obtaining the energy-consuming event sequence.

4. The energy consumption simulation and evaluation system for an embedded device according to claim 3, wherein said graphical configuration management module is arranged for processing a graphical configuration based on input parameters of said event generator, wherein the input parameters of said event generator is generated by an event generator policy configuration module, wherein said event generator policy configuration module is arranged for processing parameters which affect a frequency of occurrence of an energy-consuming event.

5. The energy consumption simulation and evaluation system for an embedded device according to claim 1, wherein the simulation process of the event generator for generating the energy-consuming event sequence comprises the steps of: analyzing a system event log of said embedded system by using a log parser; and obtaining the energy-consuming event sequence.

6. The energy consumption simulation and evaluation system for an embedded device according to claim 5, wherein said graphical configuration management module is arranged for processing a graphical configuration based on input parameters of said event generator, wherein the input parameters of said event generator is the system event log or a log from other simulation tools.

7. The energy consumption simulation and evaluation system for an embedded device according to claim 6, wherein the system event log has the format of: "event occurrence time, event completion time, event component, current status of the component, status of the component in the next step".

8. The energy consumption simulation and evaluation system for an embedded device according to claim 1, wherein a process of building an AADL model of software and hardware components of said energy consumption simulation and evaluation system for the embedded device by utilizing an AADL abstract description of software and hardware at system level based on the parameters configuration of said graphical configuration management module comprises the steps of: (a) based on a hardware architecture template library and component property of said energy consumption simulation and evaluation system for the embedded device, graphical customizing software and hardware templates; (b) based on a policy library and software policy of said energy consumption simulation and evaluation system for the embedded device, graphical customizing software and hardware policy; (c) based on the results from step (a) and step (b), generating a hardware architecture and a software architecture of said energy consumption simulation and evaluation system for the embedded device and obtaining a behavior of the software and hardware; (d) using AADL to build a graphical model for the hardware architecture and the software architecture of said energy consumption simulation and evaluation system for the embedded device, and also for the behavior of the software and hardware; and (e) finally building the AADL model of said energy consumption simulation and evaluation system for the embedded device.

9. The energy consumption simulation and evaluation system for an embedded device according to claim 1, wherein the process of transforming the AADL description model of said software and hardware components of said embedded system to the GSPN model comprises the steps of:

based on a GSPN modeling method and with the AADL, building an energy consumption model using GSPN;

wherein four elements in the GSPN energy consumption model correspond to the following elements of the AADL description model:

S: state library, describing interaction activity between the embedded device and internal and external environments based on event; corresponding to mode in AADL description model;

T: state transition, modeling through transition of activity, generating activity from event and causing state changes by activity; corresponding to transition in AADL description model;

F: directed arc set, describing conditions for occurrence of state transition and effect of state transition, corresponding to connection in AADL description model;

M: token, describing an event occurrence pattern in library, capable of continuous activity during transition in Place; corresponding to energy-consuming event in AADL description model.

10. The energy consumption simulation and evaluation system for an embedded device according to claim 1, wherein said system further comprises a graphical results analysis sub-module arranged for processing a graphical display of the residual energy, the system lifetime, energy consumption of components, executed events and the most energy consuming event based on the simulation result of the GSPN device energy consumption model, and generating a simulation log according to the parameter configuration.

* * * * *